(12) United States Patent
Klop et al.

(10) Patent No.: US 10,384,730 B2
(45) Date of Patent: Aug. 20, 2019

(54) ELECTRONIC ACTIVE AIR DAM

(71) Applicant: FORD GLOBAL TECHNOLOGIES, LLC, Dearborn, MI (US)

(72) Inventors: Aaron Peter Klop, Bloomfield Hills, MI (US); Kenneth Allan Anderson, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 15/485,271

(22) Filed: Apr. 12, 2017

(65) Prior Publication Data
US 2018/0297647 A1 Oct. 18, 2018

(51) Int. Cl.
B62D 35/00 (2006.01)
B62D 37/02 (2006.01)
B62D 35/02 (2006.01)
F16H 25/20 (2006.01)

(52) U.S. Cl.
CPC .......... *B62D 35/005* (2013.01); *B62D 37/02* (2013.01); *B62D 35/02* (2013.01); *F16H 25/20* (2013.01); *Y02T 10/82* (2013.01); *Y02T 10/88* (2013.01)

(58) Field of Classification Search
CPC ............................ B62D 35/005; B62D 37/02
USPC ..................................................... 296/180.1
See application file for complete search history.

(56) References Cited

U.S. PATENT DOCUMENTS

| 4,659,130 | A | 4/1987 | Dimora et al. | |
| 6,079,769 | A | 6/2000 | Fannin et al. | |
| 6,209,947 | B1* | 4/2001 | Rundels | B62D 35/005 296/180.1 |
| 7,775,582 | B2 | 8/2010 | Browne et al. | |
| 8,186,746 | B2 | 5/2012 | Mackenzie et al. | |
| 8,292,350 | B2 | 10/2012 | Li et al. | |
| 8,677,817 | B2 | 3/2014 | Li et al. | |
| 8,702,152 | B1 | 4/2014 | Platto et al. | |
| 2010/0140976 | A1* | 6/2010 | Browne | B62D 35/005 296/180.1 |
| 2013/0341110 | A1* | 12/2013 | Butlin, Jr. | B62D 35/005 180/68.1 |
| 2014/0054923 | A1* | 2/2014 | Rode | B60K 11/085 296/180.2 |
| 2016/0229467 | A1 | 8/2016 | Miller et al. | |

* cited by examiner

*Primary Examiner* — Joseph D. Pape
(74) *Attorney, Agent, or Firm* — Jason Rogers; Vichit Chea; King & Schickli PLLC

(57) ABSTRACT

An active air dam system includes an air dam comprising a static portion and a sliding portion driven by an actuator system. A controller system is provided, configured to cause the actuator system to translate the sliding portion vertically between a retracted position and a plurality of deployed positions according to one or more of a vehicle under-engine heat exchanger input and a vehicle drive train mode input. Methods for controlling the air dam system are provided.

20 Claims, 4 Drawing Sheets

ELECTRONIC ACTIVE AIR DAM

TECHNICAL FIELD

This disclosure relates generally to air dams for motor vehicles. In particular, the disclosure relates to an active air dam which can be raised or lowered according to various inputs related to under-engine heat exchanger temperature and vehicle drive train mode.

BACKGROUND

It is known to provide aerodynamic air deflectors or "air dams" for motor vehicles, to assist in managing airflow passing beneath the vehicle. By use of such air deflectors, aerodynamic drag/drag coefficient can be reduced and concurrently motor vehicle fuel efficiency can be improved. Likewise, air deflectors assist in limiting motor vehicle lift. For example, vehicle front air dams limit motor vehicle front end lift by creating a down-force, forcing the vehicle nose down and so improving vehicle handling and stability. Still more, properly designed front air dams may assist in engine cooling and therefore efficiency.

Of necessity, air deflectors extending below the motor vehicle chassis reduce ground clearance. This may be of little import when the vehicle is traveling on a smooth road. However, when the vehicle is travelling on a rough road, excessive reduction in ground clearance may result in vehicle damage and potentially a loss of stability and handling. For example, even if the vehicle does not actually strike an obstacle in the road, sudden braking or steering may cause the vehicle nose to dip or roll, in turn causing a portion of a front air dam to strike the road surface and cause damage and potential impairment of vehicle stability and handling. On the other hand, at lower speeds or under less rigorous operating conditions the air deflector may not be needed to improve fuel efficiency, vehicle handling, and/or engine cooling, and retraction of the air deflector may be desirable.

For this reason, it is known in the art to provide translatable air dams which may be raised to increase front approach angle and ground clearance. Such translatable air dams, while effective for their intended purpose, require at least a translatable portion, frames or other devices for holding the translatable portion, and actuators such as motors, hydraulic or pneumatic actuators, etc. for translating the vertical portion, and other components. In turn, control mechanisms and software for controlling translation of translatable air dams can be quite complex. These features can significantly add to complexity and weight of a vehicle, and to repair/replacement costs if damaged. Further, such translatable air dams are often limited in their range of motion, i.e. in the number of deployed positions available relative to the vehicle.

To solve this and other problems, the present disclosure relates to a compact and efficient translatable air dam system. The described system is advantageously lightweight and simple in design.

SUMMARY

In accordance with the purposes and benefits described herein, in one aspect of the present disclosure an active air dam system is provided, comprising an air dam comprising a static portion and a sliding portion driven by an actuator system and a controller system configured to cause the actuator system to translate the sliding portion vertically between a retracted position and a plurality of deployed positions according to one or more of a vehicle under-engine heat exchanger input and a vehicle drive train mode input. The static portion may include one or more guide structures along which the sliding portion translates.

In embodiments, the actuator system comprises a pair of screw jacks carried by the static portion and a pair of cooperating nuts carried by the cooperating vertically sliding portion. Each of the pair of screw jacks is rotationally actuated by a rotary actuator. In embodiments, the rotary actuator may be a "smart" motor configured with stepper motor logic or may comprise a position sensor. In embodiments, the controller system may comprise a control module system selected from one or both of a vehicle powertrain control module and a vehicle body control module.

In embodiments, the vehicle under-engine heat exchanger input may be provided by a temperature sensor selected from one or more of the group consisting of a vehicle exhaust outlet temperature sensor, a vehicle transmission oil temperature sensor, and a vehicle water temperature sensor. In embodiments, the vehicle drive train mode input is indicative that the vehicle drive train has been placed in a trailer tow mode.

In another aspect of the present disclosure, methods for controlling an active air dam are provided, comprising providing an air dam as described above comprising a static portion and a sliding portion driven by an actuator system. A controller system is provided configured to cause the actuator system to translate the sliding portion vertically between a retracted position and a plurality of deployed positions according to one or more of a vehicle under-engine heat exchanger temperature value input and a vehicle drive train mode input.

In embodiments, the controller system may be selected from one or both of a vehicle powertrain control module and a vehicle body control module. In embodiments, the vehicle under-engine heat exchanger input may be provided by a temperature sensor selected from one or more of the group consisting of a vehicle exhaust outlet temperature sensor, a vehicle transmission oil temperature sensor, and a vehicle water temperature sensor. In embodiments, the vehicle drive train mode input is indicative that the vehicle drive train has been placed in a trailer tow mode.

In the following description, there are shown and described embodiments of the disclosed rapidly retractable front air dam and methods for using same. As it should be realized, devices and methods are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed translatable air dam system, and together with the description serve to explain certain principles thereof. In the drawings.

Reference will now be made in detail to embodiments of the disclosed translatable air dam system, examples of which are illustrated in the accompanying drawing figures.

DETAILED DESCRIPTION

Preliminarily, the present disclosure describes a vehicle air deflector or air dam primarily in the context of a front-mounted air deflector for altering air flow beneath/around a vehicle chassis, specifically a front air dam. However, the skilled artisan will appreciate that the disclosed systems and devices are readily adaptable to other types of vehicle air deflector, including without intending any limitation fender flares, side skirt cribs, top and/or rear spoilers, and others. Application of the presently described devices, systems, and methods to all such embodiments is contemplated herein.

Figure 1:
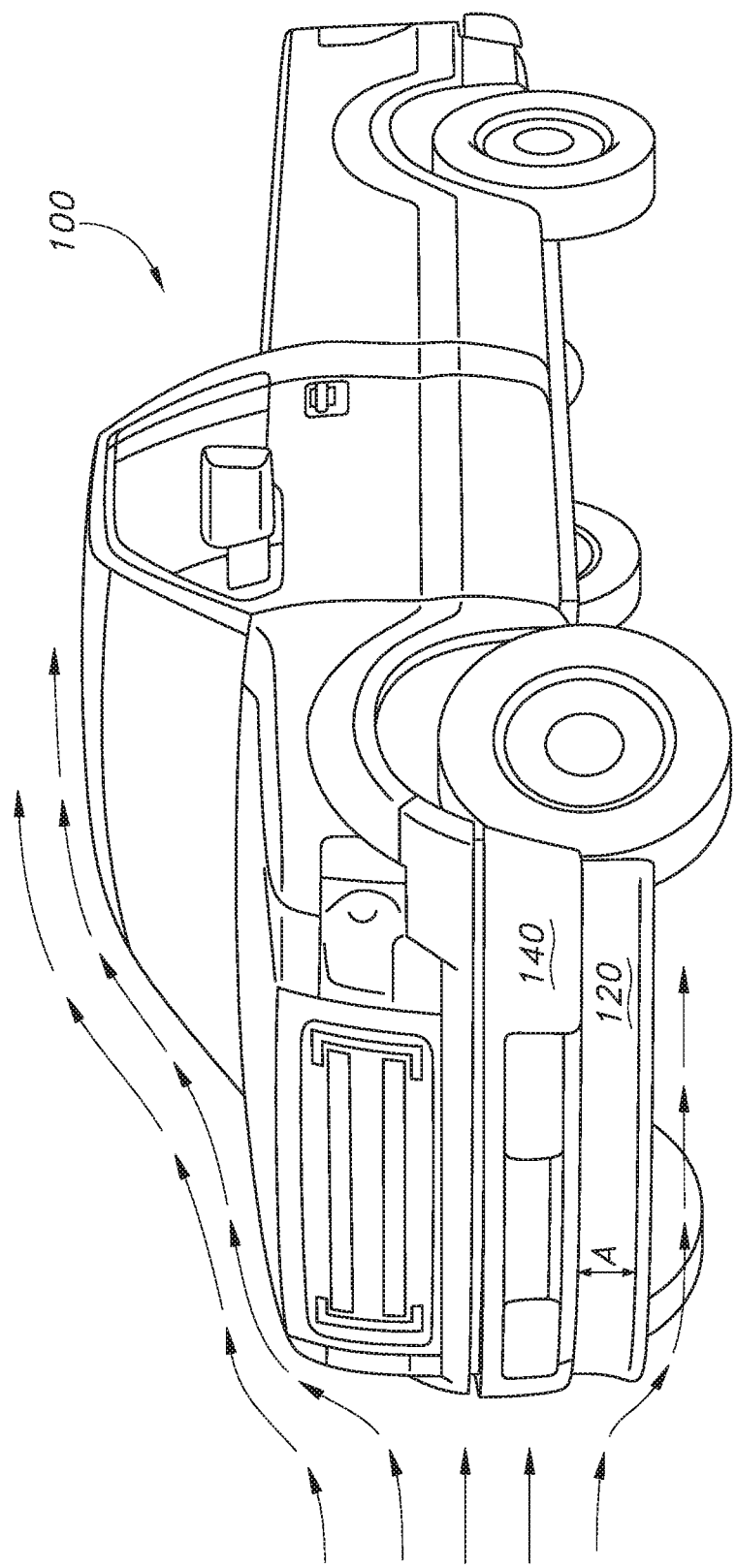
FIG. 1 shows a vehicle including an active air dam according to the present disclosure.

With reference to FIG. 1, a motor vehicle 100 is provided including a translatable active air dam 120 disposed substantially adjacent and behind a vehicle bumper 140 and deployable substantially vertically (arrow A) downwardly from the vehicle to control airflow (see arrows) below the vehicle 100. The active air dam 120 reduces airflow below the vehicle 100, thereby reducing the tendency of the nose of the vehicle to lift when traveling at speed. Likewise, by use of translatable air dams 120 having a variety of configurations, airflow below the vehicle can be increased or decreased as needed to assist in cooling underbody components.

Figure 2:
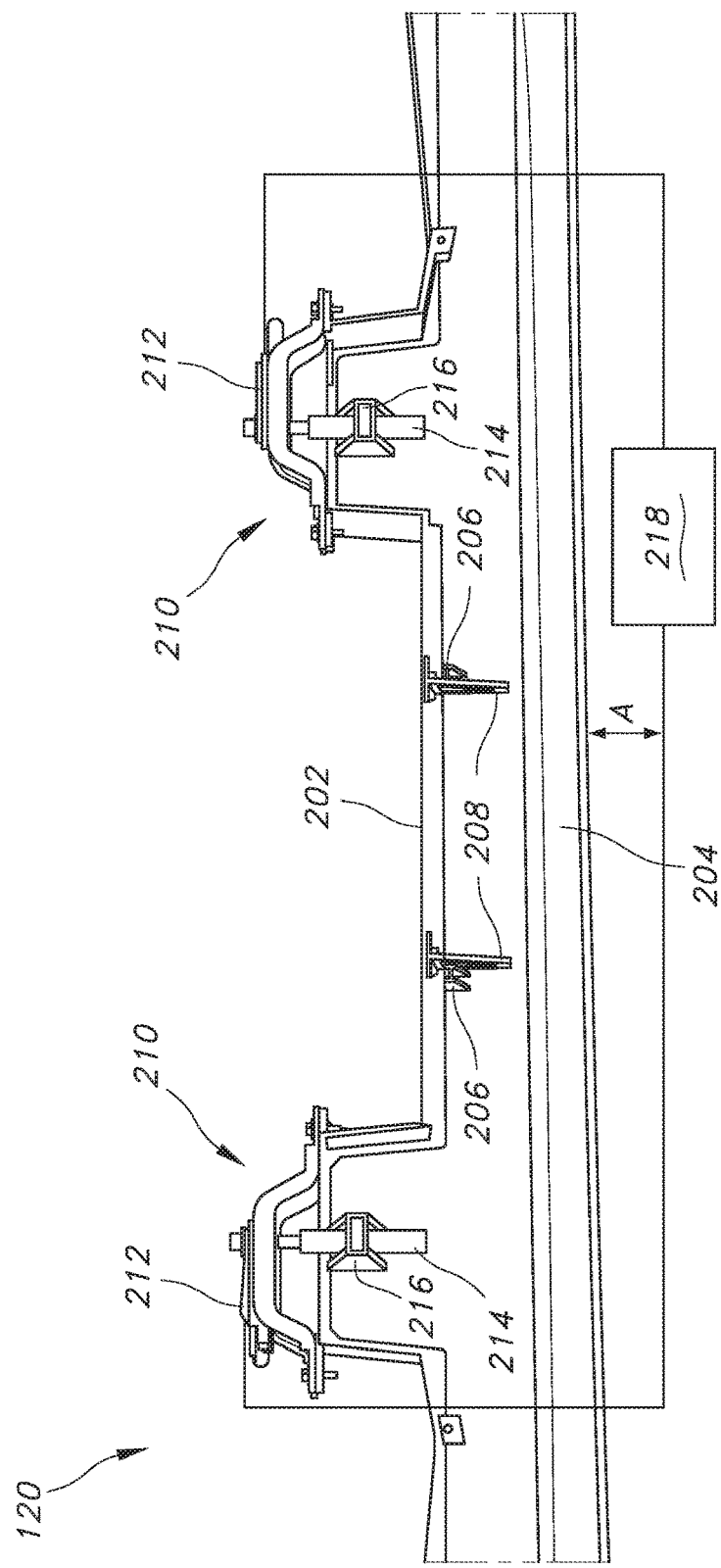
FIG. 2 shows a rear view of the active air dam of FIG. 1.

FIG. 2 illustrates the active air dam 120 in isolation, carried by one or more brackets 200. The active air dam 120 includes a static portion 202 (i.e., a portion that does not translate relative to the vehicle 100) and a sliding portion 204. The static portion 202 may include one or more guide structures 206 to define a path of travel for the sliding portion 204. In an embodiment, the guide structures 206 may define T-shaped slots for slidingly receiving cooperating T-shaped rails 208 included in the sliding portion 204. However, numerous other suitable guide structure 206 and cooperating rails 208 are known and are contemplated for use herein.

The active air dam 120 sliding portion 204 is configured for vertical translation (arrow A) by an actuator system 210. In an embodiment, the actuator system 210 comprises a pair of actuators 212 carried by the static portion 202, with each actuator driving a screw jack 214. Each screw jack 214 is threaded through a cooperating nut 216 carried by the sliding portion 204. As will be appreciated, when the actuators 212 are caused to turn in a first direction, the screw jacks 214 will threadingly displace the nuts 216, translating the sliding portion 204 in a first direction. When the actuators 212 are caused to turn in a second direction, the screw jacks 214 will threadingly displace the nuts 216 in an opposite direction, translating the sliding portion 204 in a second, opposite direction. So, for example, counterclockwise rotation of the screw jacks 214 will translate the sliding portion 204 from a retracted position to one or more deployed positions, and vice-versa.

Of course, alternative configurations are possible and contemplated. For example, a single actuator 212/screw jack 214 may suffice to translate sliding portion 204. Alternatively, two or more screw jacks 214 may be provided, each driven by a single actuator 212. All such alternative configurations are contemplated.

Likewise, use of any suitable material is contemplated for fabricating the active air dam 120 components, including the static portion 202, the sliding portion 204, and the screw jacks 214. In an embodiment, a suitable injection molded flexible material is used to fabricate the static portion 202 and the sliding portion 204, and a suitably durable plastic material is used to fabricate the screw jacks 214. As will be appreciated, this provides a durable but lightweight assembly, with an additional advantage of necessitating a relatively less powerful actuator 212 for translating the sliding portion 204.

In turn, a number of actuator 212 designs are contemplated. In an embodiment a suitable rotary actuator is utilized to drive screw jack 214. The actuator 212 may be configured with stepper or position sensor-type mechanisms or logic, allowing a displacement of the sliding portion 204 to be rigorously controlled according to the number of rotations of the screw jack 214. Non-limiting examples include an actuator 212 such as a stepper motor, a "smart" motor configured with stepper motor logic, or a motor such as a brushless DC electric motor configured with a position sensor such as a Hall effect sensor. As will be appreciated, such actuators 212 equipped with stepper or position sensor-type mechanisms or logic allow a near-infinite number of deployed positions and attendant ground clearance values for the sliding portion 204.

Figure 3:
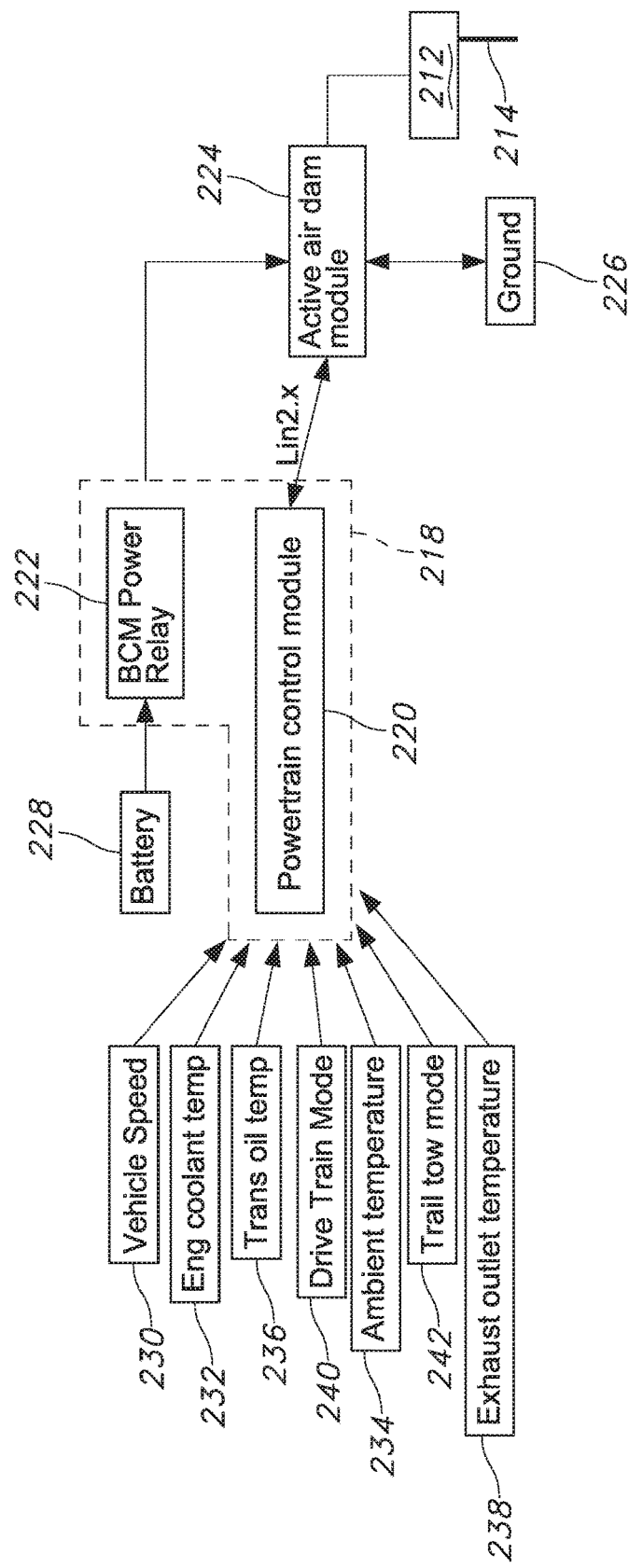
FIG. 3 shows a block diagram of a sensor array and controller system for the active air dam of FIG. 1.

The active air dam system 120 further comprises a controller system 218. One potential embodiment of the controller system 218 is shown in block diagram form in FIG. 3, and includes a control module system which may comprise one or more vehicle control modules acting alone or in concert to control actuation of the actuators 212. In the depicted embodiment, the control module system comprises a Powertrain Control Module 220 and a Body Control Module 222 which, as is known, may communicate with one another and with a variety of other vehicle 100 control systems, controllers, and components by a variety of means, such as signals transmitted via the vehicle LIN or CAN network. The controller system 218 may communicate with an active air dam control module 224 which is operationally linked to the actuator(s) 212 to control deployment/retraction of the active air dam sliding portion 204 towards or away from the ground 226. A power source 228 such as the vehicle battery supplies electrical power for actuation of the components of the active air dam system 120.

The controller system 218 communicates with a variety of vehicle 100 systems, and may receive inputs that dictate whether/how far the active air dam sliding portion 204 should be caused to deploy/retract. In turn, the controller system 218 is provided with logic for controlling operation of the actuators 212 according to those inputs. The logic may include computer-executable instructions for operating the actuators 212 in a first direction for a desired number of rotations, or in an opposed second direction for a desired number of rotations, to deploy or raise the active air dam sliding portion 204 as needed.

In embodiments, the inputs are variously representative of vehicle 100 operating conditions/severity of operating conditions. As examples, it is known to provide sensors providing measures of vehicle speed (as nonlimiting examples, transmission/transaxle output sensors and wheel rpm sensors), engine temperature, vehicle drive train mode, and others. In one possible configuration, the controller system 218 receives inputs from one or more of a vehicle speed sensor 230, an engine coolant temperature 232, and an ambient temperature sensor 234. Further, the controller system 218 may receive inputs from one or more sensors indicative of an under-engine heat exchanger status, such as a transmission oil temperature sensor 236 and/or an exhaust outlet temperature sensor 238. Still further, the controller system 218 may receive inputs representative of a vehicle drive train mode or status, for example one or both of a drive train mode sensor 240 (indicating whether the vehicle 100 is in two-wheel drive, all-wheel drive, four-wheel drive, etc.) and a trailer tow mode sensor 242.

Data provided by the above listed and other sensors and systems may be utilized as variables/inputs by the controller system 218, i.e. one or both of the Powertrain Control Module 220 and/or Body Control Module 222 to implement control methods comprising algorithms which are used by the controller system 218 to determine whether/how far the active air dam sliding portion 204 should be deployed/raised. The analysis for deploying the sliding portion 204 may be relatively simple, i.e. whether the vehicle 100 meets a threshold speed value. For example, a speed of more than 45 mph for more than 15 seconds could trigger lowering the sliding portion 204. Likewise, a speed of more than 55 mph for any time frame could trigger lowering the sliding portion 204. Then, the improved aerodynamic/fuel economy benefits of the deployed active air dam sliding portion 204 could be realized.

The analysis of a need for/benefit of raising the sliding portion 204 is more complex and may encompass a number of inputs relative to under-engine temperature and drive train mode. As the skilled artisan will appreciate, inputs indicative of increasing under-engine temperature dictate a need for additional cooling airflow which could be provided by raising the sliding portion 204. Likewise, inputs indicative of a drive train mode suggestive of rough terrain and/or operating conditions such as trailer towing which might increase the load placed on the vehicle 100 engine under otherwise unremarkable conditions or reduce the ability of the vehicle to compensate for reduced ground clearance could necessitate raising the sliding portion 204.

Figure 4:
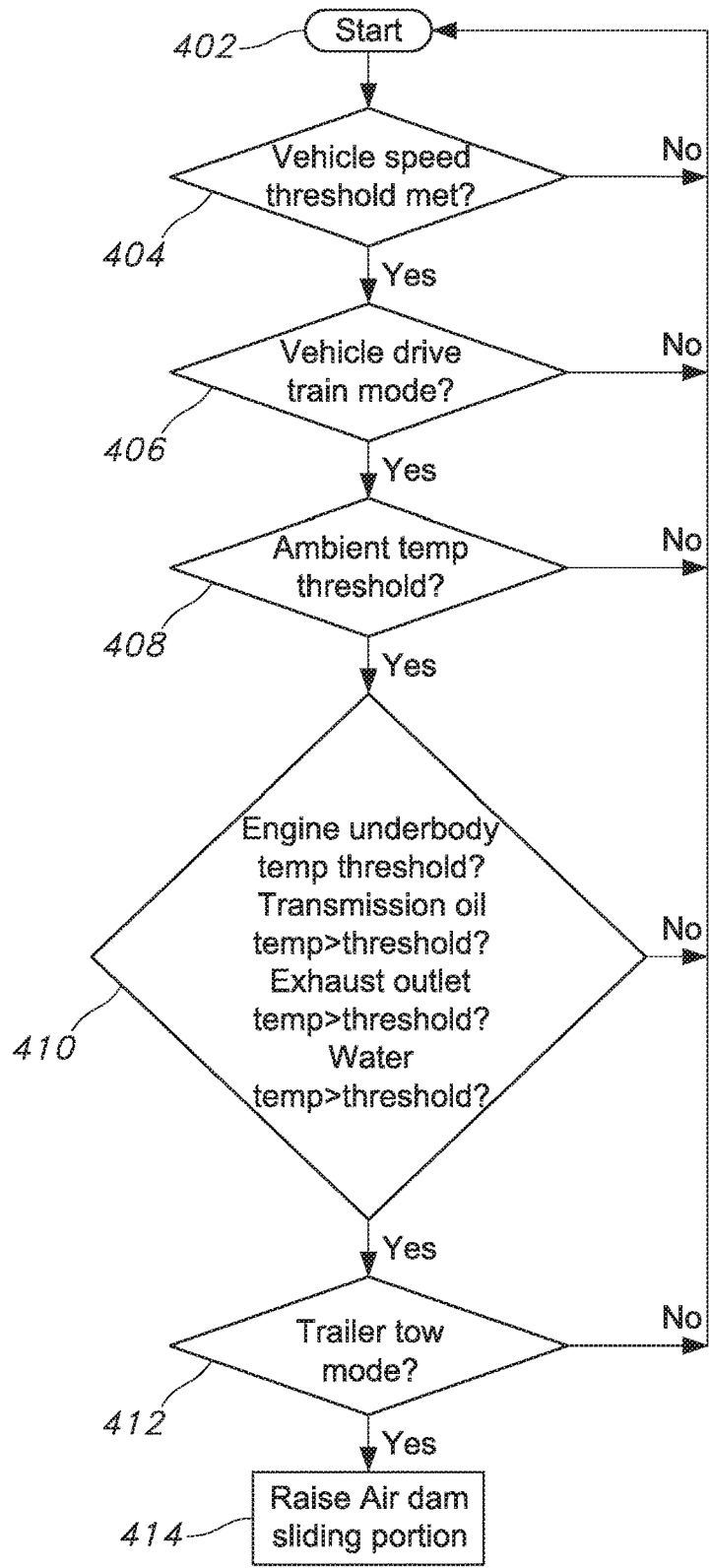
FIG. 4 shows in flow chart form a representative method for controlling deployment/raising of the active air dam of FIG. 1.

One possible embodiment of such a control method 400 is illustrated in FIG. 4. As shown therein, the controller system 218 may apply one or more threshold determinations, i.e. whether the vehicle 100 speed meets or exceeds a threshold speed dictating whether the sliding portion 204 should be raised (step 404). This could be as simple as a determination of a vehicle 100 speed of less than 45 mph for 15 seconds or of a vehicle speed of 55 mph for any time causing the controller system 218 to issue a "sliding portion up" command. Likewise, a determination of a vehicle drive train mode (step 406) placed in four-wheel drive or other mode indicative of rough terrain would cause the controller system 218 to issue a "sliding portion up" command. Equally, exceeding an ambient temperature threshold or threshold range (step 408) would cause the controller system 218 to issue a "sliding portion up" command.

However, vehicle speed, drive train mode, and ambient temperature alone may not dictate a need to raise the sliding portion 204, as other conditions affect whether additional potential for contacting obstacles/rough road surfaces and/or determine a need for added vehicle underbody cooling airflow. In the depicted embodiment, this includes a determination of an engine underbody temperature threshold (step 410) indicative of operating or ambient conditions necessitating added underbody cooling airflow. As depicted in the drawing, this could be provided by a determination of one or more of a transmission oil temperature threshold being exceeded, of an exhaust outlet temperature threshold being exceeded, and of a water temperature threshold being exceeded.

In turn, other factors may contribute to reduced vehicle 100 performance and/or increased vehicle engine load under conditions which would otherwise not impact the above analyses and thresholds. Thus, in addition the above inputs or alternatively, the controller system 218 may receive inputs indicative that the vehicle 100 has been placed in trailer tow mode (step 412). As is known to the skilled artisan, towing a load such as a trailer imposes additional stresses on vehicle components such as the engine, cooling systems, brakes, and under-engine heat exchangers. Thus, even under operating conditions of speed, terrain, etc. that would otherwise not create conditions satisfying any of the above-listed temperature thresholds, a vehicle 100 towing a trailer might well do so.

If one or more of the above-described thresholds/conditions are met, at step 414 the controller system 218 causes actuators 212 to rotate screw jacks 214 as needed to raise the active air dam sliding portion 204.

Of course, the above thresholds are presented as examples only, and are not to be taken as limiting. For example, the various described temperature thresholds will vary in accordance with the vehicle type, engine type, transmission type, etc., and in accordance with other parameters.

Thus, by the above-described structures and mechanisms, an active air dam and control system are provided for raising and lowering of a sliding portion of the active air dam in accordance with various parameters representative of vehicle engine load. The system is simple, robust, and efficient, requiring simple, light componentry and controllable from existing vehicle controllers provided input from existing vehicle systems such as the various sensors and mode indicators described above. Obvious modifications and variations are possible in light of the above teachings. All such modifications and variations are within the scope of the appended claims when interpreted in accordance with the breadth to which they are fairly, legally and equitably entitled.

What is claimed:

1. An active air dam system, comprising:
   an air dam comprising a static portion and a sliding portion driven by an actuator system; and
   a controller system configured to cause the actuator system to translate the sliding portion vertically between a retracted position and a plurality of deployed positions according to one or both of a vehicle under-engine temperature value input and a vehicle drive train mode input.

2. The active air dam system of claim 1, wherein the static portion includes one or more guide structures along which the sliding portion translates.

3. The active air dam system of claim 1, wherein the actuator system comprises a pair of screw jacks carried by the static portion and a pair of cooperating nuts carried by the cooperating vertically sliding portion.

4. The active air dam system of claim 3, wherein each of the pair of screw jacks is rotationally actuated by a rotary actuator.

5. The active air dam system of claim 4, wherein the rotary actuator comprises a stepper or a position sensor function.

6. The active air dam system of claim 1, wherein the controller system comprises a control module system selected from one or both of a vehicle powertrain control module and a vehicle body control module.

7. The active air dam system of claim 1, wherein the vehicle under-engine temperature value input is provided by a temperature sensor selected from one or more of the group consisting of a vehicle exhaust outlet temperature sensor, a vehicle transmission oil temperature sensor, and a vehicle water temperature sensor.

8. The active air dam system of claim 1, wherein the vehicle drive train mode input is indicative that the vehicle drive train has been placed in a trailer tow mode.

9. In a vehicle, a method for controlling an active air dam, comprising:

provifing an air dam comprising a static portion and a sliding portion driven by an actuator system; and by a controller system, causing the actuator system to translate the sliding portion vertically between a retracted position and a plurality of deployed positions according to one or more of a vehicle under-engine temperature value input and a vehicle drive train mode input.

10. The method of claim 9, including providing the static portion including one or more guide structures along which the sliding portion translates.

11. The method of claim 9, including providing the actuator system comprising a pair of screw jacks carried by the static portion and a pair of cooperating nuts carried by the cooperating vertically sliding portion.

12. The method of claim 11, including rotationally actuating each of the pair of screw jacks by a rotary actuator.

13. The method of claim 12, including providing the rotary actuator configured comprising a stepper or a position sensor function.

14. The method of claim 9, including providing the controller system selected from one or both of a vehicle powertrain control module and a vehicle body control module.

15. The method of claim 9, including providing the vehicle under-engine temperature value input by a temperature sensor selected from one or more of the group consisting of a vehicle exhaust outlet temperature sensor, a vehicle transmission oil temperature sensor, and a vehicle water temperature sensor.

16. The method of claim 9, including providing the vehicle drive train mode input indicative that the vehicle drive train has been placed in a trailer tow mode.

17. A method for controlling an active air dam position, comprising configuring a controller system operationally linked to an active air dam actuator system to translate the active air dam from one of a plurality of deployed positions to a retracted position according to one or more of a vehicle under-engine temperature value input and a vehicle drive train mode input.

18. The method of claim 17, including providing the controller system selected from one or both of a vehicle powertrain control module and a vehicle body control module.

19. The method of claim 17, including providing the vehicle under-engine temperature value input by a temperature sensor selected from one or more of the group consisting of a vehicle exhaust outlet temperature sensor, a vehicle transmission oil temperature sensor, and a vehicle water temperature sensor.

20. The method of claim 17, including providing the vehicle drive train mode input indicative that the vehicle drive train has been placed in a trailer tow mode.

* * * * *